United States Patent [19]

Crain

[11] Patent Number: 5,454,393
[45] Date of Patent: Oct. 3, 1995

[54] SEISMIC EVENT SHUT-OFF GAS VALVE

[76] Inventor: Michael J. Crain, 11545 S. Tenth Ave., Hanford, Calif. 93230

[21] Appl. No.: 281,624
[22] Filed: Jul. 28, 1994
[51] Int. Cl.⁶ .................................................. F16K 17/36
[52] U.S. Cl. .................................................... 137/38
[58] Field of Search ................................................ 137/38

[56] References Cited

U.S. PATENT DOCUMENTS

| | | | |
|---|---|---|---|
| 2,215,044 | 9/1940 | Kammerdiner | 137/38 |
| 2,585,316 | 2/1952 | Hobson | 137/38 |
| 3,747,616 | 7/1973 | Lloyd | 137/38 |
| 4,116,209 | 9/1978 | Greer | 137/38 |
| 4,640,303 | 2/1987 | Greenberg | 137/38 |
| 5,074,327 | 12/1991 | Reid | 137/38 |
| 5,240,025 | 8/1993 | Morris | 137/38 |

Primary Examiner—Robert G. Nilson

[57] ABSTRACT

A seismic event shut-off gas valve having a primary conduit arranged for orientation in a vertical position, and a secondary conduit intersecting the primary conduit at an intersection, with a plug member slidably secured in the secondary conduit in a first position and slidable to a second position, wherein the plug member is arranged to engage a sealing ring within the primary conduit upon dislodgement of the plug member from the first position by a seismic event. A chain member secured to the cap and the plug member permits the cap member to be removed from the secondary conduit to withdraw the plug member from the second position to the first position and reposition the plug member in the secondary conduit to the first position.

4 Claims, 4 Drawing Sheets

SEISMIC EVENT SHUT-OFF GAS VALVE

TECHNICAL FIELD

The field of invention relates to shut-off valves, and more specifically to a seismic event shut-off gas valve arranged to effect pneumatic flow shut-off relative to occurrence of a seismic event.

BACKGROUND OF THE INVENTION

Various seismic event shut-off valve structure is available in the art, as exemplified by the U.S. Pat. Nos. 5,115,829; 4,331,171; 5,209,252; and 5,143,110.

The instant invention is directed to improvement over such prior art seismic shut-off valve structure by employing a shut-off valve that is readily reset subsequent to occurrence of a seismic event and is effective in effecting shut-off of the valve structure relative to fluid flow therethrough.

SUMMARY OF THE INVENTION

The present invention relates to a seismic event shut-off valve wherein a primary conduit is arranged to receive a plug member from a secondary conduit that is dislodged from the secondary conduit upon disturbance of the secondary conduit relative to a seismic event directing vibration and the like thereto. To this end, the plug member is provided with a recess arranged to receive a projection positioned within the seismic event, with a chain extending from the plug member to a cap removably mounted relative to the secondary conduit, whereupon removal of the cap permits displacement of the plug member permitting its ease of reset relative to the projection.

Objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DESCRIPTION OF THE PREFERRED EMBODIMENT

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
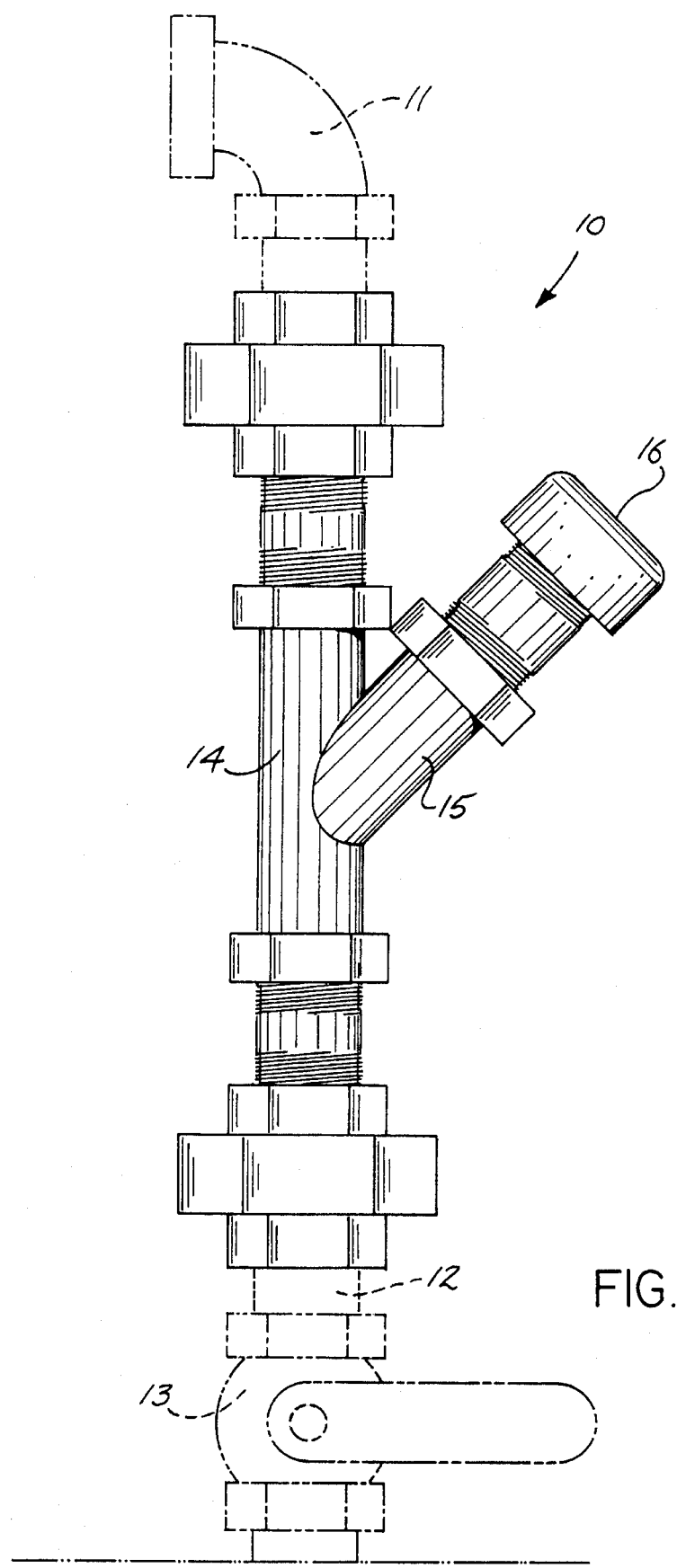
FIG. 1 is an orthographic view of the invention.
Figure 2:
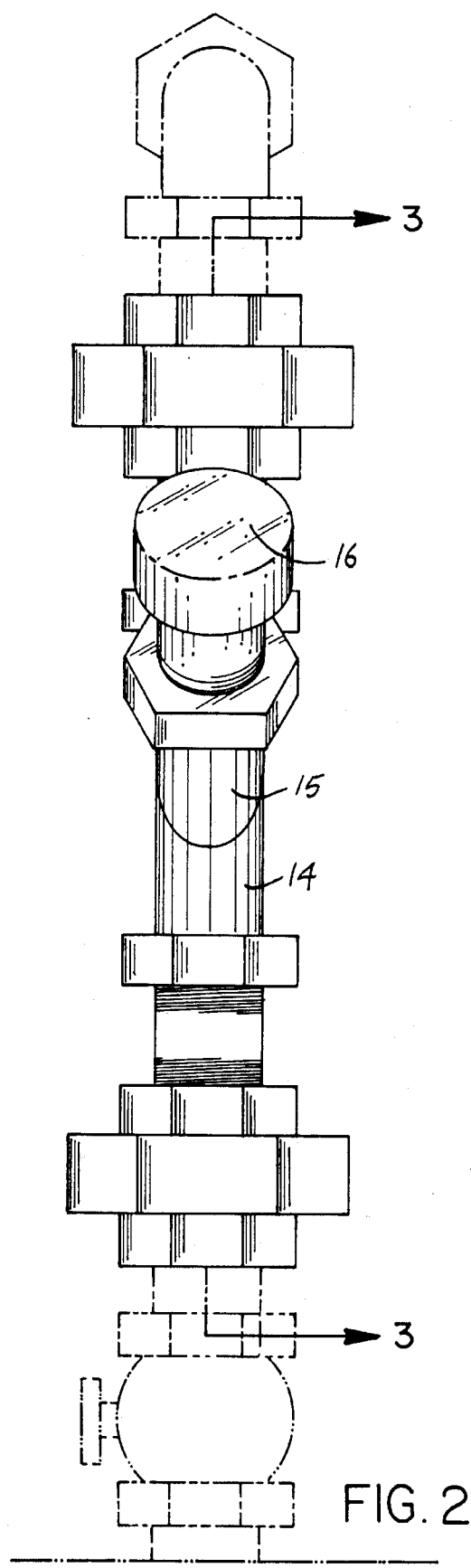
FIG. 2 is an orthographic view of the invention rotated ninety degrees relative to FIG. 1.
Figure 5:
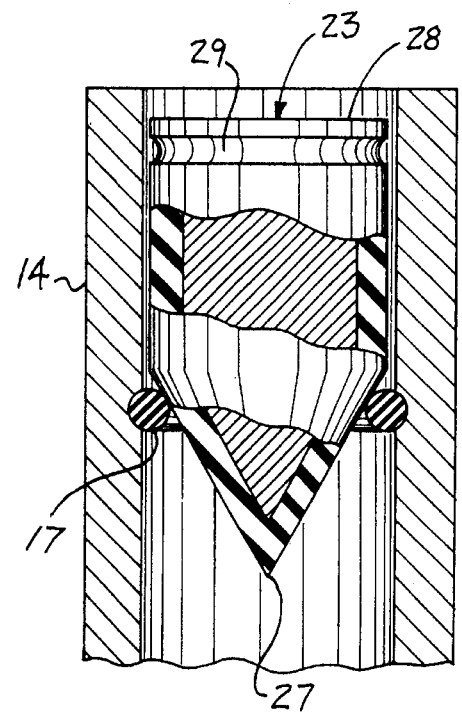
FIG. 5 is an enlarged orthographic view of the plug member seated within the sealing ring of the primary conduit.
Figure 4:
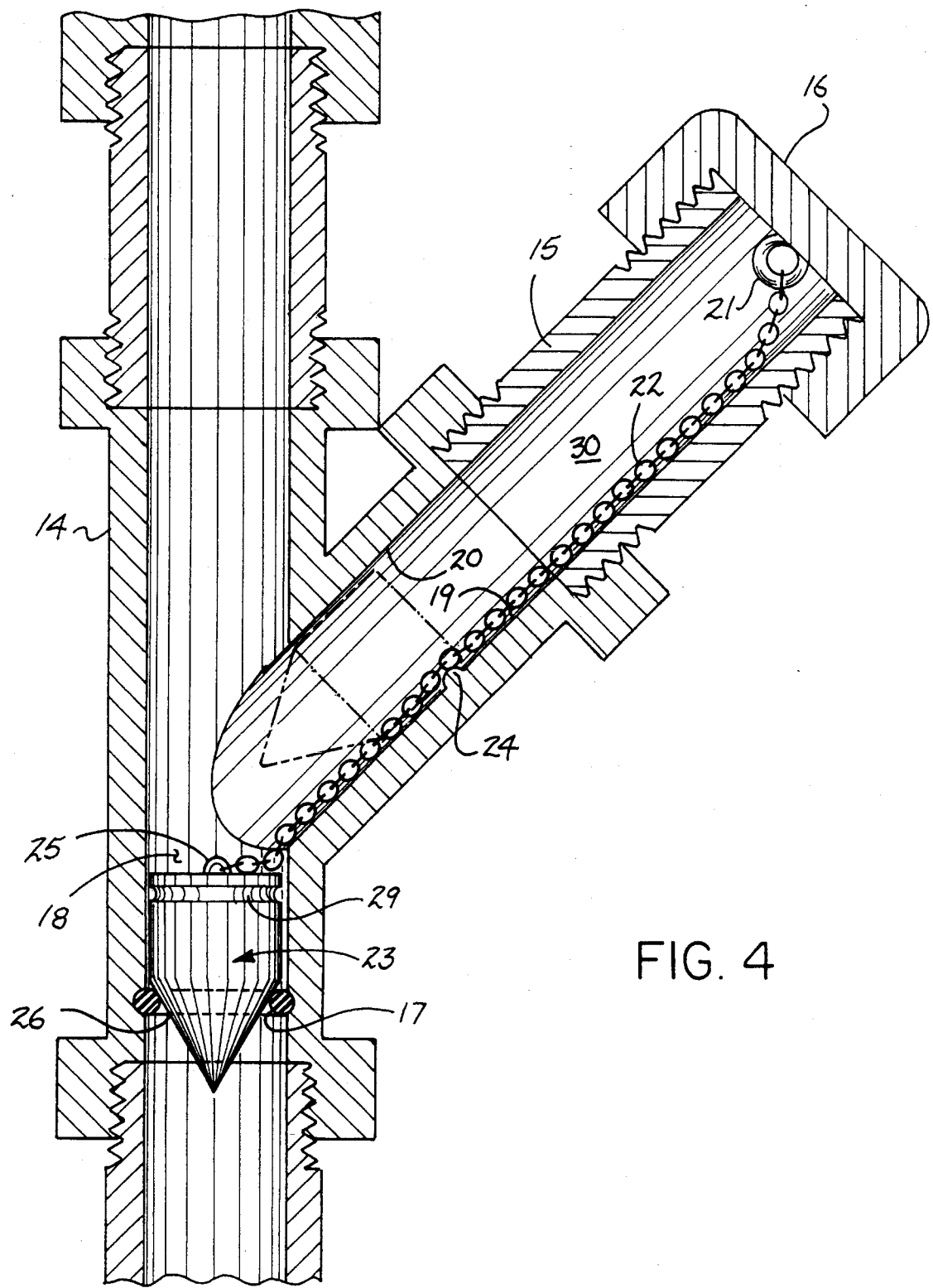
FIG. 4 is an enlarged orthographic view of the secondary conduit in its cooperation with a primary conduit taken in cross-section.

The invention, as indicated in FIG. 1, includes a gas inlet conduit 11 typically directed from a gas meter (not shown) to a primary conduit 14 that has attached at its other end relative to the inlet conduit 11, an outlet conduit 12 that employs a typical shut-off valve 13. The primary conduit 14 has fixedly secured thereto a secondary conduit 15 in pneumatic communication relative to the primary conduit 14. This secondary conduit 15 extends beyond the primary conduit and terminates in a cap member 16 removably mounted relative to the outermost distal end of the second conduit 15. With specific reference to the FIGS. 4 and 5 for example, a sealing ring 17 is positioned within the primary conduit, and more specifically within the primary conduit's cavity 18, with the sealing ring 17 extending into the cavity adjacent an intersection of the primary conduit 14 with the secondary conduit 15. With reference to FIG. 4 for example, the secondary conduit has a secondary conduit floor 19 intersecting the primary conduit 14 at an obtuse angle, while the secondary conduit is further provided with a secondary conduit roof 20 diametrically opposed to the floor 19, with the secondary conduit roof 20 intersecting the primary conduit 14 at an acute angle.

Figure 3:
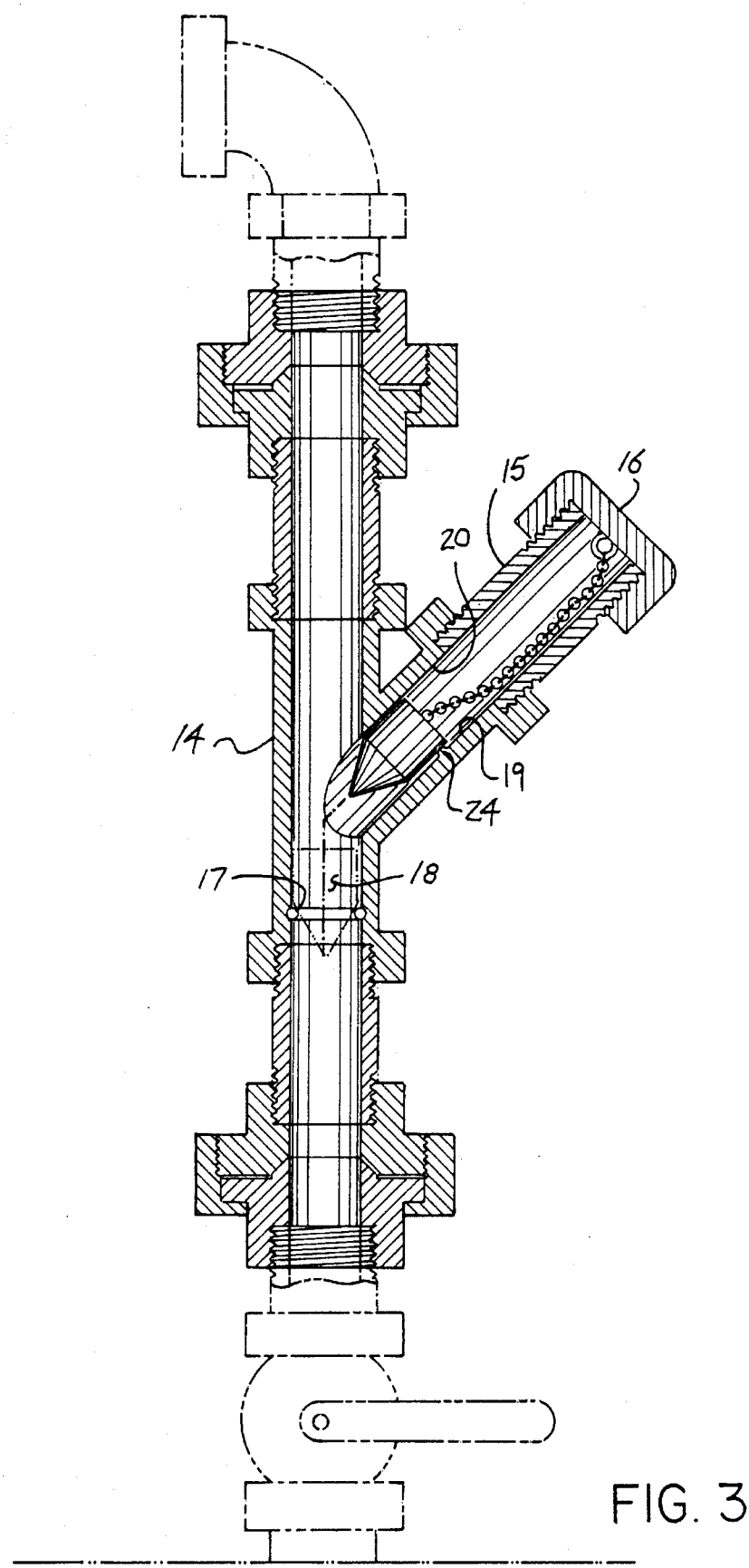
FIG. 3 is an orthographic view, taken along the lines 3—3 of FIG. 2 in the direction indicated by the arrows.

The cap member 16 is provided with a cap anchor 21 positioned within the secondary conduit cavity 30 when the cap member 16 is secured to the secondary conduit. A chain 22 has a chain first end secured to the cap anchor 21 and a chain second end secured to a plug member 23. Further, within the secondary conduit 5 is a projection 24 fixedly secured to the secondary conduit floor 9 and arranged for reception within a recess 29 of the plug member 23 when the plug member is in a first position, with the projection separated relative to the pug member and the recess 29 when the plug member is in a second position, as illustrated in FIG. 4, with the plug member having a plug side wall seat 26 engaging the sealing ring 17 to seal gas flow from the inlet conduit to the outlet conduits 11 and 12 respectively. The secondary conduit cavity 30 is defined by a predetermined first width, with the plug member having a plug width defined by a second width less than the first width to permit the plug member to separate relative to the projection 24 and to slide past the intersection of the primary conduit with the secondary conduit and permit seating upon the sealing ring 17. To this end, the plug side wall seat 26 is spaced from the plug anchor 25 a spacing such that in combination with the legs of the chain 22, a first length is defined. The sealing ring 17 is spaced from the cap anchor 21 a second length that is greater than or equal to the first length to permit the plug member 23 to slide from the first position to the second position, as illustrated in the FIG. 3, with the second position illustrated in phantom in FIG. 3. As illustrated, the plug first end 27 is spaced from the plug second end 28, with the plug second end 28 having the plug anchor 25 pivotally mounting the chain at the chain second end, with the cap anchor 2 pivotally mounting the chain at the chain's first end.

Subsequent to the plug member being displaced from the first position to the second position to permit ease of reset of the plug member to the first position, the cap member 16 is simply removed relative to the outermost distal end of the secondary conduit 15 and withdrawn from the second position by the chain 22 permitting the plug member to be pulled back into the secondary conduit and the projection 24 to be directed into the recess 29.

It is to be understood that while certain forms of the present invention have been illustrated and described herein, it is not to be limited to the specific forms or arrangement of parts described and shown.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed and desired to be protected by LETTERS PATENT of the United States is as follows:

1. A seismic event shut-off gas valve, comprising, a primary conduit, the primary conduit having a primary conduit cavity, and a secondary conduit having a secondary conduit cavity fixedly secured to the primary conduit at an intersection, with the secondary conduit having a secondary conduit cavity in pneumatic communication with the primary conduit cavity, and the primary conduit having a first end arranged to receive an inlet conduit, and the primary conduit having a second end arranged to receive an outlet conduit, with the primary conduit having a sealing ring extending into the primary conduit cavity oriented between the intersection and the primary conduit second end, and a plug member means positioned within the secondary conduit and arranged for displacement from a first position within the secondary conduit to a second position when the plug member is in engagement with the sealing ring, the secondary conduit having a secondary conduit floor and a secondary conduit roof, the secondary conduit floor is opposed to the secondary conduit roof, the secondary conduit roof intersects the primary conduit at an acute angle, a projection fixedly secured to the secondary conduit floor spaced from the intersection, and the plug member, with the recess receiving the projection when the plug member is in the first position, and the projection is separated relative to the recess when the plug member is in the second position.

2. A gas valve as set forth in claim 1 wherein the plug member means includes a plug member having a plug member side wall, a plug member first end spaced from a plug member second end, and a plug member side wall arranged to engage the sealing ring when the plug member is in the second position.

3. A gas valve as set forth in claim 2 with the plug second end having a plug anchor fixedly secured thereto, and the secondary conduit having a secondary conduit outermost distal end spaced from the intersection, and the outermost distal end having a cap member removably mounted thereto, the cap member having a cap anchor fixedly secured to the cap member, with the cap anchor received within the secondary conduit cavity when the cap member is secured to the secondary conduit, and a chain having a chain first end secured to the cap anchor, and a chain second end secured to the plug anchor.

4. A gas valve as set forth in claim 3 wherein the plug side wall seat and the chain define a first length, and the sealing ring is spaced from the cap anchor a second length, with the first length at least equal to the second length.

* * * * *